(12) United States Patent
Yu

(10) Patent No.: US 11,422,295 B2
(45) Date of Patent: Aug. 23, 2022

(54) IMAGE CAPTURE DEVICE, OPTICAL FILTER FILM, AND METHOD FOR MANUFACTURING OPTICAL FILTER FILM

(71) Applicant: Chicony Electronics Co., Ltd., New Taipei (TW)

(72) Inventor: An-Hwa Yu, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 334 days.

(21) Appl. No.: 16/711,395

(22) Filed: Dec. 11, 2019

(65) Prior Publication Data

US 2020/0310017 A1 Oct. 1, 2020

(30) Foreign Application Priority Data

Mar. 27, 2019 (TW) .................................. 108110788

(51) Int. Cl.
*G02B 5/28* (2006.01)
*H04N 5/225* (2006.01)
(52) U.S. Cl.
CPC ............ *G02B 5/288* (2013.01); *G02B 5/281* (2013.01); *H04N 5/2254* (2013.01)
(58) Field of Classification Search
CPC ............................... G02B 5/288; H04N 5/2254
See application file for complete search history.

(56) References Cited

U.S. PATENT DOCUMENTS

| 2016/0077257 A1* | 3/2016 | Tatemura | G02B 1/10 |
| | | | 359/359 |
| 2016/0119527 A1* | 4/2016 | Shahid | G03B 33/00 |
| | | | 348/148 |
| 2019/0025511 A1* | 1/2019 | Rothberg | G01N 21/648 |
| 2020/0112662 A1* | 4/2020 | Sakamoto | H04N 9/04553 |

FOREIGN PATENT DOCUMENTS

| CN | 204640955 U | 9/2015 |
| TW | 201233164 A | 8/2012 |
| TW | 201819963 A | 6/2018 |
| TW | 201901190 A | 1/2019 |

* cited by examiner

*Primary Examiner* — Thanh Luu
(74) *Attorney, Agent, or Firm* — CKC & Partners Co., LLC

(57) ABSTRACT

An image capture device includes an image detector, at least one lens, and an optical filter which optically coupled between the image detector and the lens and having an optical filter film. The optical filter film includes first and second metal oxide layers which are alternately stacked. A first refractive index of the first metal oxide layer is greater than a second refractive index of the second metal oxide layer. The optical filter film has a thickness ranging from 620 nm to 640 nm. A wavelength spectrum corresponding to light transmittance of the optical filter has a first pass band, a second pass band, and a blocking range between the first and second pass bands. A value corresponding to cut-off wavelength of the first pass band is less than 660 nm, and a value corresponding to cut-on wavelength of the second pass band is greater than 830 nm.

8 Claims, 3 Drawing Sheets

IMAGE CAPTURE DEVICE, OPTICAL FILTER FILM, AND METHOD FOR MANUFACTURING OPTICAL FILTER FILM

RELATED APPLICATIONS

This application claims priority to Taiwanese Application Ser. No. 108110788, filed Mar. 27, 2019, which is herein incorporated by reference.

BACKGROUND

Technical Field

The present disclosure relates to an image capture device, an optical filter film, and a method for manufacturing an optical filter film.

Description of Related Art

In the market of consumer electronic products, since portable devices, such as smart phones, smart watches, tablets, have been developed with various functions, such devices gradually attract attention in the market of the consumer electronic products. For example, the smart phones can provide with functions of browsing web pages, texting message, making a phone call, and capturing an image.

On the other hand, performance of these portable devices are developed to become more advanced. For the function of the capturing an image, in addition to capturing a static image or a dynamic image by a camera, a capturing theme is divided into a day mode and a night mode. The camera may further process the captured image in accordance with a difference between illumination in day and night. Therefore, how to achieve that the camera can be switched between the day mode and the night mode has become a research-and-development direction in the related field.

SUMMARY

An aspect of the present disclosure is to provide an image capture device including an image detector, at least one lens, and an optical filter. The optical filter is optically coupled between the image detector and the lens and has an optical filter film. The optical filter film includes a plurality of first metal oxide layers and a plurality of second metal oxide layers which are alternately stacked. Each of the first metal oxide layers has a first refractive index, and each of the second metal oxide layers has a second refractive index. The first refractive index is greater than the second refractive index, and the optical filter film has a thickness in a range from 620 nm to 640 nm. A wavelength spectrum in accordance with a relationship between light transmittance of the optical filter and wavelength has a first pass band, a second pass band, and a blocking range. A value corresponding to cut-off wavelength of the first pass band is less than 660 nm, and a value corresponding to cut-on wavelength of the second pass band is greater than 830 nm. The blocking range is within an interval between the cut-off wavelength of the first pass band and the cut-on wavelength of the second pass band.

In some embodiments, a value corresponding to cut-on wavelength of the first pass band is greater than 395 nm, and a value corresponding to cut-off wavelength of the second pass band is less than 880 nm.

In some embodiments, an average value of the light transmittance of the optical filter in a wavelength interval of the first pass band from 420 nm to 640 nm is greater than 97.5% and less than 99%.

In some embodiments, an average value of the light transmittance of the optical filter in a wavelength interval of the second band from 835 nm to 870 nm is greater than 97.5% and less than 99%.

In some embodiments the optical filter further includes an anti-reflection film optically coupled between the optical filter film and the image detector.

In some embodiments, the optical filter further includes a transparent substrate disposed between the optical filter film and the anti-reflection film and having a front surface and a back surface. The front surface faces the lens and forms an interface with the optical filter film, and the back surface faces the image detector and forms an interface with the anti-reflection film.

In some embodiments, the light transmittance of the optical filter in a first wavelength interval of the wavelength spectrum increases from less than 30% to greater than 95%. An initial value of the first wavelength interval is in a range from 393 nm to 395 nm, and an end value of the first wavelength interval is in a range from 408 nm to 411 nm. The light transmittance of the optical filter in a second wavelength interval of the wavelength spectrum decreases from greater than 95% to less than 5%. An initial value of the second wavelength interval is in a range from 643 nm to 645 nm, and an end value of the second wavelength interval is in a range from 660 nm to 662 nm.

In some embodiments, the light transmittance of the optical filter in a third wavelength interval of the wavelength spectrum increases from less than 10% to greater than 95%. An initial value of the third wavelength interval is in a range from 823 nm to 828 nm, and an end value of the third wavelength interval is in a range from 832 nm to 836 nm. The light transmittance of the optical filter in a fourth wavelength interval of the wavelength spectrum decreases from greater than 95% to less than 5%. An initial value of the fourth wavelength interval is in a range from 869 nm to 873 nm, and an end value of the fourth wavelength interval is in a range from 881 nm to 885 nm.

An aspect of the present disclosure is to provide an optical filter film including a plurality of first metal oxide layers and a plurality of second metal oxide layers. Each of the first metal oxide layers has a first refractive index and comprises niobium, and each of the second metal oxide layers has a second refractive index and comprises silicon. The first refractive index is greater than the second refractive index. The first metal oxide layers and the second metal oxide layers are alternately stacked, so as to a multilayer stack structure having a thickness in a range from 620 nm to 640 nm.

In some embodiments, in the multilayer stack structure, the number of the first metal oxide layers is twenty seven and the number of the second metal oxide layers is twenty seven.

An aspect of the present disclosure is to provide a method for manufacturing an optical filter film including steps as follows. A first thin-film forming process including ion bombardment of a first target is performed, in which the first target includes niobium such that a niobium oxide thin-film is formed on a transparent substrate A second thin-film forming process including ion bombardment of a second target is performed, in which the second target includes silicon such that a silicon oxide thin-film is formed on the transparent substrate. The first thin-film forming process and the second thin-film forming process are alternately performed, so as to form a multilayer stack structure having a thickness in a range from 620 nm to 640 nm on the transparent substrate.

DETAILED DESCRIPTION

Figure 1:
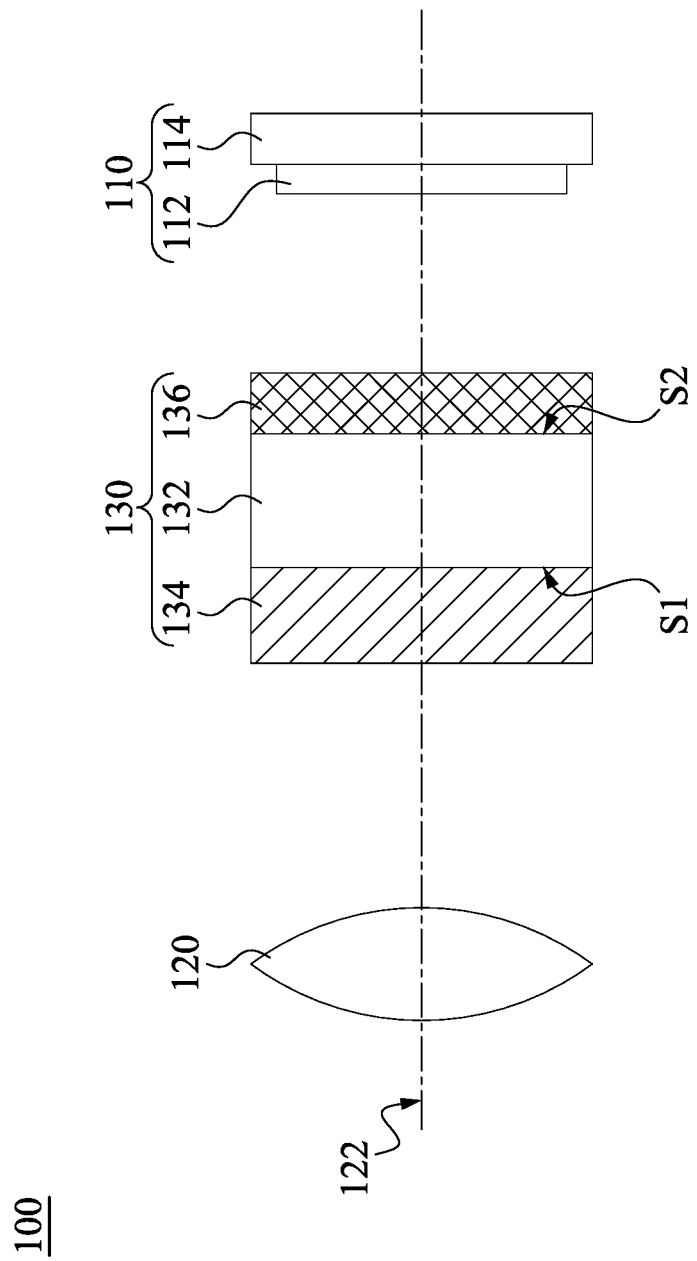
FIG. 1 is a schematic diagram illustrating a structure of an image capture device according to some embodiments of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms "first," "second," etc., may be used herein to describe various elements, components, areas, or layers, these elements should not be limited by these terms. These terms are used to distinguish one element, component, area, or layer from another. For example, a first element could be termed a second element, and, similarly, a second element could be termed a first element, without departing from the scope of the embodiments. As used herein, the term "and/or" includes any and all combinations of one or more of the associated listed items.

The term "substantially", "about" or "approximately" in the present disclosure refers to the fact that embodiments having any tiny variation or modification not affecting the essence of the technical features can be included in the scope of the present disclosure. For example, the term "substantially", "about" or "approximately" may mean a value with a standard deviation, such as a value with a variation with ±30 percent, ±20 percent, ±10 percent, or ±5 percent. Numerical quantities given herein are approximate, meaning that the term "substantially", "about" or "approximately" can be inferred if not expressly stated.

An image capture device of the present disclosure can directly capture target images or videos in either a day mode or a night mode by an optical filter that is a dual-passband filter (i.e., with respect to a visible waveband and an infrared waveband). Therefore, the image capture device can complete capturing the image in either the day mode or the night mode without an external mechanism.

Reference is made to FIG. 1 which is a schematic diagram illustrating a structure of an image capture device 100 according to some embodiments of the present disclosure. The image capture device 100 includes an image detector 110, a lens 120, and an optical filter 130 that is optically coupled between the image detector 110 and the lens 120.

The image detector 110 includes a photosensitive component 112 and a circuit board 114, in which the photosensitive component 112 is disposed on the circuit board 114 and is electrically connected to the circuit board 114. In some embodiments, the photosensitive component 112 may be a charge coupled device (CCD) or a CMOS active pixel sensor which can be configured to convert a captured image into an electrical signal. The circuit board 114 can be configured deliver the electrical signal converted from the photosensitive component 112 to an external circuit or an external device.

The lens 120 can be a converging lens and have an optical axis 122 passing through the image detector 110 and the optical filter 130. The lens 120 can be configured to guide light to pass through the optical filter 130 and to travel toward the image detector 110. Although the number of the lens 120 illustrated in FIG. 1 is one, the present disclosure is not limited thereto. In other embodiments, the lens 120 can be replaced by a lenses group which includes at least one convex lens, at least one concave lens, or combinations thereof.

The optical filter 130 includes a transparent substrate 132, a first optical film 134, and a second optical film 136, in which the transparent substrate 132 is disposed between the first optical film 134 and the second optical film 136. The transparent substrate 132 may be a glass substrate, such as borosilicate glass, which can be configured to serve a carrier substrate in a manufacturing process of the optical filter 130. In some embodiments, the transparent substrate 132 has a thickness in arrange from 0.3 mm to 1.1 mm. The transparent substrate 132 has a front surface S1 and a back surface S2. The front surface S1 faces the lens 120, and the back surface S2 faces the image detector 110.

The first optical film 134 and the second optical film 136 are respectively disposed on the front surface S1 and the back surface S2. The first optical film 134 and the front surface S1 of the transparent substrate 132 can form an interface, and the second optical film 136 and the back surface S2 of the transparent substrate 132 can form an interface. In other words, the first optical films 134 is optically coupled between the lens 120 and the second optical film 136, and the second optical film 136 is optically coupled between the first optical film 134 and the image detector 110.

The first optical film 134 can allow light to pass therethrough, and the first optical film 134 can filter light traveling from the lens 120 toward the image detector 110. For example, interference or reflection of some wavebands of the light may occur in the first optical film 134, such that the first optical film 134 can confine a waveband of the light to pass therethrough. Accordingly, the first optical film 134 can be referred to as an optical filter film.

The second optical film 136 is anti-reflective. In some embodiments, an average reflectivity of the second optical film 136 with respect to light with a waveband from 400 nm to 640 nm can be less than or equal to 1%, and an average reflectivity of the second optical film 136 with respect to light with a waveband from about 835 nm to about 865 nm can be less than or equal to 1%. Furthermore, in some embodiments, an average reflectivity of the second optical film 136 with respect to light with a waveband from about 900 nm to about 1100 nm can be less than or equal to 2%.

Figure 2:
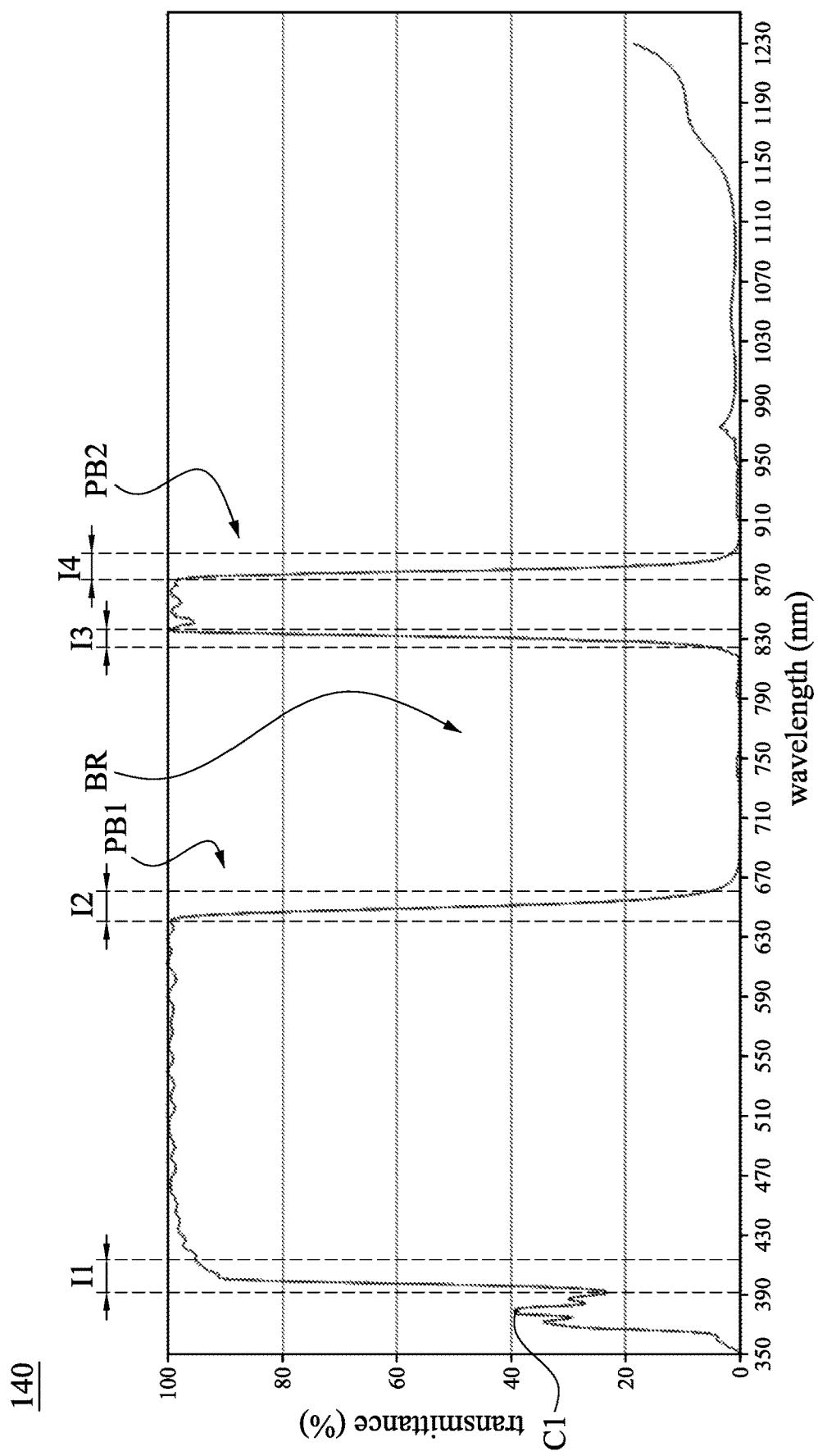
FIG. 2 is a wavelength spectrum in accordance with a relationship between light transmittance of an optical filter of FIG. 1 and wavelength.

The following descriptions are provided to further state optical property of the optical filter 130. Reference is made to FIG. 2 which is a wavelength spectrum 140 in accordance with a relationship between light transmittance of an optical filter 130 of FIG. 1 and wavelength. In FIG. 2, a horizontal axis represents wavelength with unit of nm, and a vertical axis represents light transmittance of the optical filter 130 with unit of percentage. The relationship between the light transmittance of the optical filter 130 and the wavelength is labeled as a curve C1. That is, the performance regarding the light transmittance of the optical filter 130 can be expressed by the curve C1. In addition, wavelength intervals illustrated in the wavelength spectrum 140 are labeled for making the descriptions easier to be understood. The present disclosure is not limited thereto, and the specific wavelength intervals can be stated by descriptions as follows.

The wavelength spectrum 140 illustrated in FIG. 2 can be referred to as a transmittance spectrum of the optical filter 130. The performance regarding the light transmittance of the optical filter 130 is contributed by the first optical film and the second optical film (e.g. the first optical film 134 and the second optical film 136 illustrated in FIG. 1) collectively. In other words, the performance regarding the light transmittance shown in the wavelength spectrum 140 illustrated in FIG. 2 may express a ratio relationship between light before and after passing through the first optical film 134 and the second optical film 136. As shown in FIG. 2, the curve C1 at least has a first pass band PB1, a second pass band PB2, and a blocking range BR.

A value corresponding to cut-on wavelength of the first pass band PB1 is greater than about 395 nm, and a value corresponding to cut-off wavelength of the first pass band PB1 is less than about 660 nm. Herein, the cut-on wavelength is a wavelength that can correspond to the transmittance of 50% or close to 50%, and the cut-off wavelength is a wavelength that can correspond to the transmittance of 50% or close to 50%. In some embodiments, the cut-on wavelength of the first pass band PB1 is about 397±2 nm, and the cut-off wavelength of the first pass band PB1 is about 650±2 nm. Accordingly, the first pass band PB1 can overlap with an visible waveband, such that light in the visible waveband can pass through the optical filter 130.

In the wavelength spectrum 140, at a position near the cut-on wavelength of the first pass band PB1, the light transmittance of the optical filter 130 can increase from less than 30% to greater than 95% with a length of wavelength interval less than 20 nm, thereby enhancing the cut-on effect of the first pass band PB1. For example, in a first wavelength interval 11 of the wavelength spectrum 140, the light transmittance of the optical filter 130 can increase from less than 30% to greater than 95%. In this regard, an initial value of the first wavelength interval 11 is in a range from about 393 nm to about 395 nm, and an end value of the first wavelength interval 11 is in a range from about 408 nm to about 411 nm. In some embodiments, the light transmittance of the optical filter 130 at the wavelength of about 395 nm is about 32%, and the light transmittance of the optical filter 130 at the wavelength of about 410 nm is about 95%.

Similarly, in the wavelength spectrum 140, at a position near the cut-off wavelength of the first pass band PB1, the light transmittance of the optical filter 130 can decrease from greater than 95% to less than 5% with a length of wavelength interval less than 20 nm, thereby enhancing the cut-off effect of the first pass band PB1. For example, in a second wavelength interval 12 of the wavelength spectrum 140, the light transmittance of the optical filter 130 can increase from greater than 95% to less than 5%. In this regard, an initial value of the second wavelength interval 12 is in a range from about 643 nm to about 645 nm, and an end value of the second wavelength interval 12 is in a range from about 660 nm to about 662 nm. In some embodiments, the light transmittance of the optical filter 130 at the wavelength of about 643 nm is about 95%, and the light transmittance of the optical filter 130 at the wavelength of about 662 nm is about 5%.

In the first pass band PB1, an average value of the light transmittance of the optical filter 130 can approach 99%, so as to enhance the light transmittance of the optical filter 130 with respect to the visible waveband. For example, an average value of the light transmittance of the optical filter 130 in a wavelength interval of the first pass band PB1 from about 420 nm to about 640 nm is greater than 97.5% and less than 99%. In some embodiments, in a wavelength interval of the first pass band PB1 from about 424 nm to about 640 nm, the light transmittance of the optical filter 130 corresponding to each wavelength value is greater than 97.5% and less than 99%.

A value corresponding to cut-on wavelength of the second pass band PB2 is greater than 830 nm, and a value corresponding to cut-off wavelength of the second pass band PB2 is less than 880 nm. In some embodiments, the cut-on wavelength of the second pass band PB2 is about 832±2 nm, and the cut-off wavelength of the second pass band PB2 is about 876±2 nm. Accordingly, the second pass band PB2 can overlap with an infrared band, such that light in the infrared band can pass through the optical filter 130.

In the wavelength spectrum 140, at a position near the cut-on wavelength of the second pass band PB2, the light transmittance of the optical filter 130 can increase from less than 10% to greater than 95% with a length of wavelength interval less than 15 nm, thereby enhancing the cut-on effect of the second pass band PB2. For example, in a third wavelength interval 13 of the wavelength spectrum 140, the light transmittance of the optical filter 130 can increase from less than 10% to greater than 95%. In this regard, an initial value of the third wavelength interval 13 is in a range from about 823 nm to about 828 nm, and an end value of the third wavelength interval 13 is in a range from about 832 nm to about 836 nm. In some embodiments, the light transmittance of the optical filter 130 at the wavelength of about 823 nm is about 5%, and the light transmittance of the optical filter 130 at the wavelength of about 836 nm is about 97%.

Similarly, in the wavelength spectrum 140, at a position near the cut-off wavelength of the second pass band PB2, the light transmittance of the optical filter 130 can decrease from greater than 95% to less than 5% with a length of wavelength interval less than 15 nm, thereby enhancing the cut-off effect of the second pass band PB2. For example, in a fourth wavelength interval 14 of the wavelength spectrum 140, the light transmittance of the optical filter 130 can increase from greater than 95% to less than 5%. In this regard, an initial value of the fourth wavelength interval 14 is in a range from about 869 nm to about 873 nm, and an end value of the fourth wavelength interval 14 is in a range from about 881 nm to about 885 nm. In some embodiments, the light transmittance of the optical filter 130 at the wavelength of about 871 nm is about 95%, and the light transmittance of the optical filter 130 at the wavelength of about 883 nm is about 5%.

In the second pass band PB2, an average value of the light transmittance of the optical filter 130 can approach 99%, so as to enhance the light transmittance of the optical filter 130 with respect to the infrared waveband. For example, an average value of the light transmittance of the optical filter 130 in a wavelength interval of the second pass band PB2 from about 835 nm to about 870 nm is greater than 97.5% and less than 99%. In some embodiments, in a wavelength interval of the second pass band PB2 from about 838 nm to about 870 nm, the light transmittance of the optical filter 130 corresponding to each wavelength value is greater than 97.5% and less than 99%.

The blocking range BR is within an interval between the cut-off wavelength of the first pass band PB1 and the cut-on wavelength of the second pass band PB2. Specifically, in the interval between the cut-off wavelength of the first pass band PB1 and the cut-on wavelength of the second pass band PB2, the light transmittance of the optical filter 130 is less than 50%. In other words, there is no any pass band between the first pass band PB1 and the second pass band PB2.

Further, in a wavelength interval of the wavelength spectrum 140 from about 670 nm to about 819 nm, an average value of the light transmittance of the optical filter 130 is greater than 0.1% and less than 0.195%. In some embodiments, in a wavelength interval of the wavelength spectrum 140 from about 672 nm to about 708 nm, the light transmittance of the optical filter 130 corresponding to each wavelength value is greater than 0.1% and less than 0.2%. In some embodiments, in a wavelength interval of the wavelength spectrum 140 from about 709 nm to about 819 nm, the light transmittance of the optical filter 130 corresponding to each wavelength value is greater than 0.1% and less than 0.5%. Therefore, the wavelength interval of the transmittance spectrum of the optical filter 130 from about 670 nm to about 819 nm can serve as a blocking zone (or cutoff zone). Furthermore, in a wavelength interval of the wavelength spectrum 140 from about 890 nm to about 1100 nm, an average value of the light transmittance of the optical filter 130 is greater than 0.1% and less than 0.91%.

By the configuration above, the optical filter 130 can allow light within the visible waveband (i.e., a wavelength interval from about 420 nm to about 640 nm) and light within the infrared waveband (i.e., a wavelength interval from about 835 nm to about 870 nm) to pass therethrough and allow light within a wavelength interval between the visible waveband and the infrared waveband (i.e., a wavelength interval from about 670 nm to about 819 nm) and light outside the infrared waveband (i.e., beyond the infrared waveband, such as a wavelength interval from about 890 nm to about 1100 nm) to reflect therefrom or be absorbed, so as to achieve an optical filter effect by dual-passband.

By applying the optical filter 130 above to the image capture device 100, the image capture device 100 can match a day mode and a night mode. For the day mode, the image capture device 100 can capture a target image or video by the visible waveband. Since the infrared waveband to be received by the image capture device 100 is confined in a specific wavelength interval (e.g., a wavelength interval from about 835 nm to about 870 nm), the infrared waveband to be received would be known. Under the condition that the infrared waveband to be received is known, the image capture device 100 can reduce the effect on the image or the video caused by the infrared waveband through taking post-production (e.g., algorithm or image processing software) on the captured image or video. For the night mode, the image capture device 100 can capture a target image or video by the visible waveband as well, and the infrared waveband can be configured to provide supplementary lighting for the captured image or video, so as to improve sharpness and brightness of the captured image or video by the image capture device 100.

Therefore, the image capture device 100 can directly complete capturing the image or video without an external mechanism for switching between the day mode and the night mode, which will be advantageous to improve lifetime of the image capture device 100 and to reduce volume of the image capture device 100.

Figure 3:
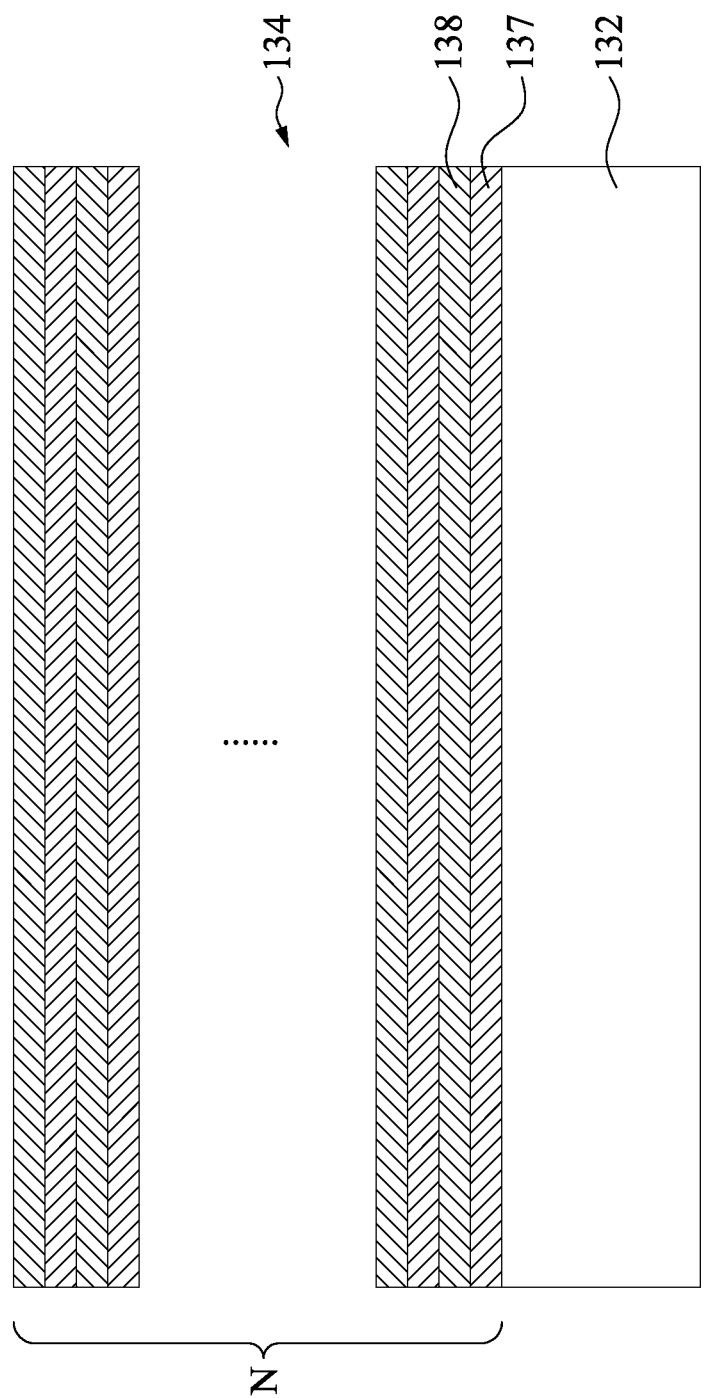
FIG. 3 is an enlarged schematic diagram illustrating a first optical film of an optical filter of FIG. 1.

The dual-passband mechanism above can be achieved by a multilayer stack structure that is formed by stacking different metal oxide layers. For example, the first optical film 134 of the optical filter 130 can be formed by stacking different metal oxide layers, as shown in FIG. 3 which is an enlarged schematic diagram illustrating a first optical film 134 of an optical filter 130 of FIG. 1.

The first optical film 134 may include a plurality of first metal oxide layers 137 and a plurality of second metal oxide layers 138. The first metal oxide layers 137 and the second metal oxide layers 138 are alternately stacked and thus can collectively form a multilayer stack structure on the transparent substrate 132.

Each of the first metal oxide layers 137 has a first refractive index and includes niobium. For example, each of the first metal oxide layers 137 may be niobium oxide ($Nb_2O_5$) and has the first refractive index equal to or greater than 2.3, such as in a range from 2.24 to 2.5. Furthermore, the different first metal oxide layers 137 may have the same thickness or different thicknesses, and each of the first metal oxide layers 137 may have a thickness in a range from 14 angstrom to 205 angstrom.

Each of the second metal oxide layers 138 has a second refractive index and includes silicon. For example, each of the second metal oxide layers 138 may be silicon oxide ($SiO_x$) and has the second refractive index equal to or less than 1.5, such as in a range from 1.4 to 1.5. Furthermore, the different second metal oxide layers 138 may have the same thickness or different thicknesses, and each of the second metal oxide layers 138 may have a thickness in a range from 20 angstrom to 185 angstrom.

In an aspect of optic, with respect to each of the first metal oxide layers 137 and the second metal oxide layers 138 having such thickness, it can be referred to as a thin film or an optical thin film. Since the first refractive index is greater than the second refractive index, the multilayer stack structure formed by alternately stacking the first metal oxide layers 137 and the second metal oxide layers 138 can be referred to as a structure including high-refractive-index thin films and low-refractive-index thin films which are alternately stacked. In this regard, the first optical film 134 can achieve the dual-passband filter and thus provide the optical filter effect by thin-film interference.

As shown in FIG. 3, the label "N" represents the total number of the first metal oxide layers 137 and the second metal oxide layers 138. In some embodiments, the label "N" may be a value of 54. In other words, in the multilayer stack structure, the number of the first metal oxide layers 137 is twenty seven and the number of the second metal oxide layers 138 is twenty seven as well. In some embodiments, the thicknesses of the first metal oxide layers 137 and the second metal oxide layers 138 are shown as table I as follows.

TABLE I the thicknesses of the first metal oxide layers and the second metal oxide layers

| Number of layers | Physic thickness (angstrom) |
|---|---|
| 1 | 14.97 |
| 2 | 36.69 |
| 3 | 121.35 |
| 4 | 160.75 |
| 5 | 89.15 |
| 6 | 151.72 |
| 7 | 201.71 |
| 8 | 147.98 |
| 9 | 76.51 |
| 10 | 137.15 |
| 11 | 74.27 |
| 12 | 135.15 |

TABLE I-continued the thicknesses of the first metal oxide
layers and the second metal oxide layers

| Number of layers | Physic thickness (angstrom) |
|---|---|
| 13 | 72.66 |
| 14 | 137.99 |
| 15 | 69.05 |
| 16 | 143.66 |
| 17 | 63.06 |
| 18 | 151.07 |
| 19 | 57.08 |
| 20 | 153.22 |
| 21 | 61.18 |
| 22 | 144.62 |
| 23 | 75.47 |
| 24 | 165.91 |
| 25 | 14.97 |
| 26 | 152.6 |
| 27 | 88.24 |
| 28 | 137.39 |
| 29 | 101.93 |
| 30 | 176.77 |
| 31 | 105.06 |
| 32 | 157.67 |
| 33 | 107.78 |
| 34 | 182.17 |
| 35 | 115.07 |
| 36 | 178.48 |
| 37 | 116.4 |
| 38 | 163.99 |
| 39 | 95.42 |
| 40 | 156.02 |
| 41 | 108.62 |
| 42 | 175.26 |
| 43 | 113.35 |
| 44 | 173.05 |
| 45 | 102.26 |
| 46 | 152.89 |
| 47 | 99.56 |
| 48 | 177.50 |
| 49 | 19.23 |
| 50 | 24.83 |
| 51 | 110.48 |
| 52 | 157.06 |
| 53 | 85.87 |
| 54 | 68.7 |

In the table I, the odd layers in the multilayer stack structure are first metal oxide layers 137 including niobium, and the even layers in the multilayer stack structure are second metal oxide layers 138 including silicon. For example, the first layer in the multilayer stack structure is the first metal oxide layers 137 with the thickness of 14.97 angstrom, and the second layer in the multilayer stack structure is the second metal oxide layers 138 with the thickness of 36.69 angstrom. In some embodiments, the multilayer stack structure formed by the first metal oxide layers 137 and the second metal oxide layers 138 has a thickness in a range from about 620 nm to about 640 nm. For example, the sum of thickness (i.e., the sum of the physic thickness) of the first layer to the fifty fourth layer is about 626.1 nm. In other words, the transmittance spectrum as shown FIG. 2 can be achieved under the thickness of the first optical film 134 is in the order of the range from about 620 nm to about 640 nm, which will be advantageous to thin the total thickness of the optical filter 130.

The multilayer stack structure formed by the first metal oxide layers 137 and the second metal oxide layers 138 can be formed by vapor radical assisted sputtering (RAS). For example, a first target, a second target and the transparent substrate 132 can be arranged in a chamber, in which the first target includes niobium and the second target includes silicon. Then, an oxygen gas can be filled into the chamber.

A process for forming a first metal oxide layer 137 can be referred to as a first thin-film forming process. When the first thin-film forming process is performed, ion bombardment of the first target can be performed, so as to form a niobium oxide thin-film on the transparent substrate 132. A process for forming a second metal oxide layer 138 can be referred to as a second thin-film forming process. When the second thin-film forming process is performed, ion bombardment of the second target can be performed, so as to form a silicon oxide thin-film on the transparent substrate 132.

When the first thin-film forming process and the second thin-film forming process are alternately performed, the first metal oxide layers 137 and the second metal oxide layers 138 can be alternately formed on the transparent substrate 132, so as to form the multilayer stack structure on the transparent substrate 132. In this regard, by performing the vapor RAS to form the first metal oxide layers 137 and the second metal oxide layers 138, stack density and compactness of the first metal oxide layers 137 and the second metal oxide layers 138 are improved, thereby increasing reliability of the first optical film 134. In other words, a range of wavelength shift may decrease. For example, in the transmittance spectrum of the formed first optical film 134, the central wavelength is at a wavelength value of about 550 nm, and a range of central wavelength shift may be ±3 nm. As such, whole central wavelength shift of the optical filter 130 may decrease to be within 10 nm.

As described above, the image capture device of the present disclosure includes the optical filter, in which the image capture device can receive the image by light passing through the optical filter. The optical filter is a dual-passband filter, such that the optical filter can allow light within the visible waveband and the infrared waveband to pass therethrough. By the optical filter, the image capture device can directly capture the images in either the day mode or the night mode. Therefore, the image capture device can complete capturing the image in either day mode or the night mode without an external mechanism.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An image capture device, comprising:
an image detector;
at least one lens; and
an optical filter optically coupled between the image detector and the lens and having an optical filter film, wherein the optical filter film comprises a plurality of first metal oxide layers and a plurality of second metal oxide layers which are alternately stacked, each of the first metal oxide layers has a first refractive index, each of the second metal oxide layers has a second refractive index, the first refractive index is greater than the second refractive index, the first metal oxide layers and the second metal oxide layers are formed by vapor radical assisted sputtering, a total number of the first metal oxide layers and the second metal oxide layers is fifty four, and the optical filter film has a thickness in a range from 620 nm to 640 nm, wherein a wavelength spectrum in accordance with a relationship between light transmittance of the optical filter and wavelength has a first pass band, a second pass band, and a blocking range, a value corresponding to cut-off wavelength of the first pass band is less than 660 nm, a value corresponding to cut-on wavelength of the second pass band is greater than 830 nm, and the blocking range is within an interval between the cut-off wavelength of the first pass band and the cut-on wavelength of the second pass band.

2. The image capture device of claim 1, wherein a value corresponding to cut-on wavelength of the first pass band is greater than 395 nm, and a value corresponding to cut-off wavelength of the second pass band is less than 880 nm.

3. The image capture device of claim 2, wherein an average value of the light transmittance of the optical filter in a wavelength interval of the first pass band from 420 nm to 640 nm is greater than 97.5% and less than 99%.

4. The image capture device of claim 2, wherein an average value of the light transmittance of the optical filter in a wavelength interval of the second band from 835 nm to 870 nm is greater than 97.5% and less than 99%.

5. The image capture device of claim 1, wherein the optical filter further comprises:
an anti-reflection film optically coupled between the optical filter film and the image detector.

6. The image capture device of claim 5, wherein the optical filter further comprises:
a transparent substrate disposed between the optical filter film and the anti-reflection film and having a front surface and a back surface, wherein the front surface faces the lens and forms an interface with the optical filter film, and the back surface faces the image detector and forms an interface with the anti-reflection film.

7. The image capture device of claim 1, wherein the light transmittance of the optical filter in a first wavelength interval of the wavelength spectrum increases from less than 30% to greater than 95%, an initial value of the first wavelength interval is in a range from 393 nm to 395 nm, and an end value of the first wavelength interval is in a range from 408 nm to 411 nm, wherein the light transmittance of the optical filter in a second wavelength interval of the wavelength spectrum decreases from greater than 95% to less than 5%, an initial value of the second wavelength interval is in a range from 643 nm to 645 nm, and an end value of the second wavelength interval is in a range from 660 nm to 662 nm.

8. The image capture device of claim 1, wherein the light transmittance of the optical filter in a third wavelength interval of the wavelength spectrum increases from less than 10% to greater than 95%, an initial value of the third wavelength interval is in a range from 823 nm to 828 nm, and an end value of the third wavelength interval is in a range from 832 nm to 836 nm, wherein the light transmittance of the optical filter in a fourth wavelength interval of the wavelength spectrum decreases from greater than 95% to less than 5%, an initial value of the fourth wavelength interval is in a range from 869 nm to 873 nm, and an end value of the fourth wavelength interval is in a range from 881 nm to 885 nm.

* * * * *